Patented Nov. 15, 1927.

1,649,670

UNITED STATES PATENT OFFICE.

ALFRED R. L. DOHME, OF BALTIMORE, MARYLAND, ASSIGNOR TO SHARP & DOHME, INC., OF BALTIMORE, MARYLAND, A CORPORATION OF NEW JERSEY.

HEXYL RESORCINOL.

No Drawing. Application filed October 12, 1927, Serial No. 225,832, and in Great Britain November 8, 1923.

This invention relates to new hexyl resorcinols, having the following formula, $C_6H_3(OH)_2C_6H_{13}$, and more particularly to normal hexyl resorcinol.

The new hexyl resorcinols may be prepared by reducing hexylyl resorcinols with a reducing agent, such as, for example, zinc amalgam and hydrochloric acid. They can also be produced from resorcinol and hexoic acids, in a two-step process in the first step of which resorcinol and hexoic acid are caused to react together at an elevated temperature in the presence of a condensing agent, such as zinc chloride. The intermediate ketone, hexylyl resorcinol, so produced, may be purified to a greater or less extent and then reduced, for example, by means of zinc amalgam and hydrochloric acid, to produce the hexyl resorcinols, which may then be purified by repeated distillation in vacuo and by crystallization from solvents, etc.

The following specific example describing the production of normal hexyl resorcinol, will illustrate one method of producing the new hexyl resorcinols.

20 pounds of anhydrous zinc chloride are dissolved in 100 parts of caproic acid, the dissolution being aided by heating and stirring. While the temperature is maintained near 135° C., 33 pounds of resorcinol are gradually added over a period of about 20 minutes, and the reaction mixture is then stirred for a period of about 3 hours at a temperature of about 135–145° C. At the end of this time an equal volume of water is added and the mixture is stirred. The oil reaction product rises to the surface, is separated from the aqueous layer, and washed with an equal volume of water and the water then separated from the washed product. The washed product is then distilled in vacuo; the traces of water and the excess caproic acid being first distilled off, and finally the hexylyl resorcinol being distilled. The hexylyl resorcinol may be further purified by redistillation and crystallization from a mixture of toluene and petroleum ether. On redistillation the distillate solidifies, giving a product of melting point around 52–55° C. Normal hexylyl resorcinol when crystallized from toluene-petroleum ether has a melting point of 54.5–56° C. The normal hexylyl resorcinol has a boiling point of about 208–215° at 12 mm. pressure and of about 195–200° C. at 8 mm. pressure.

While the pure crystalline hexylyl resorcinol can be used for the production therefrom of hexyl resorcinol, it is not necessary to isolate the hexylyl resorcinol in a pure state, but the oil produced by distillation of the reaction product above referred to can be directly used for the reduction.

The method of reduction will be illustrated by the following example:

One part by weight of normal hexylyl resorcinol is reduced by 2½ parts of zinc amalgam in five parts of hydrochloric acid (20Bé.) and six parts of water, with vigorous stirring at 105°. The reduction is complete in about ten to twelve hours. The reduction product is washed with an equal volume of water and the water layer separated. The reduction product is then distilled in vacuo whereby the last traces of water are removed and finally the normal hexyl resorcinol is distilled. It has a boiling point of 215–220° at 18 mm. On cooling, the distillate solidifies and the solid possesses a melting point of 45–55°. The solidified distillate from the second distillation (boiling point 170–180° at 8 mm.) possesses a melting point of 49–56°. When this second distillate is crystallized from a mixture of toluene and petroleum ether white crystals are obtained of a melting point of 57–58.5° C. When further purified by crystallization, for example, from a mixture of petroleum ether and ligroin and further crystallized from petroleum ether it melts at about 67.5–69° C. The product after recrystallization boils at 178–180° C. at 6–7 mm.

Normal hexyl resorcinol has a remarkably high phenol coefficient, possessing more than 70 times the germicidal power of phenol as measured by the United States Hygiene Laboratory method. It is easily soluble in benzol, alcohol and ether, difficultly soluble in water and is a valuable therapeutic agent as an antiseptic and germicide.

This application is a continuation in part of my prior applications Serial No. 654,928, filed July 31, 1923 and Serial No. 26,815, filed April 29, 1925.

I claim:

1. New products comprising hexyl resorcinols having the following formula:

$$C_6H_3(OH)_2C_6H_{13}.$$

2. As new compounds pure hexyl resorcinols having the following formula:

$$C_6H_3(OH)_2C_6H_{13},$$

being crystalline compounds.

3. A new product comprising normal hexyl resorcinol.

4. As a new product, normal hexyl resorcinol, said product being easily soluble in benzol, alcohol and ether, difficultly soluble in water and being a valuable therapeutic agent as an antiseptic and germicide.

In testimony whereof I affix my signature.

ALFRED R. L. DOHME.